(12) United States Patent
Slaughter et al.

(10) Patent No.: US 6,202,146 B1
(45) Date of Patent: Mar. 13, 2001

(54) ENDIANNESS CHECKING FOR PLATFORM-INDEPENDENT DEVICE DRIVERS

(75) Inventors: Gregory L. Slaughter, Palo Alto; Thomas Saulpaugh, San Jose; Bernard Traversat, San Francisco, all of CA (US); Jeffrey A. Schmidt, Boulder Creek, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/106,910

(22) Filed: Jun. 29, 1998

(51) Int. Cl.$^7$ .............................. G06F 9/00; G06F 15/177
(52) U.S. Cl. ............................. 713/1; 713/100; 711/100
(58) Field of Search .................................. 707/205–206, 707/103; 711/100; 713/1, 100, 2; 709/301, 303, 327

(56) References Cited

U.S. PATENT DOCUMENTS

| 5,309,563 | 5/1994 | Farrand et al. | |
|---|---|---|---|
| 5,404,494 | * 4/1995 | Garney | 709/300 |
| 5,701,476 | * 12/1997 | Fenger | 713/2 |
| 5,701,483 | * 12/1997 | Pun | 709/301 |
| 5,867,690 | * 2/1999 | Lee et al. | 710/65 |
| 5,898,896 | * 4/1999 | Kaiser et al. | 710/65 |
| 5,937,170 | * 8/1999 | Bedarida | 711/202 |

FOREIGN PATENT DOCUMENTS

0737917A2  10/1996  (EP) .

WO97/44739  11/1997  (WO) .

OTHER PUBLICATIONS

Lemon et al., "An Object Oriented Device Driver Model," IEEE, 1995, pp. 360–366.

Edward Tuggle, "Advanced Topics In Device Driver Design," Proceedings of the Annual Embedded Systems Conference.

Panagiotis Kougiouris, "A Device Management Framework for an Object–Oriented Operating System," Report of Department of Computer Science University of Illinois at Urbana–Champaign, May 1991, pp. 1–73.

\* cited by examiner

*Primary Examiner*—Dennis M. Butler
(74) *Attorney, Agent, or Firm*—Beyer Weaver & Thomas, LLP

(57) ABSTRACT

Methods, apparatus, and software for endianness checking for platform-independent device drivers is described. According to one embodiment, the method of the invention includes generating a memory allocation request from a platform-independent device driver. The driver instantiates a memory constraints object that is configured to report the endianness of the driver. The request is received by a bus manger that is configured to process memory allocation requests from the device driver and has an endianness independent of the device driver. If the endianness of the bus manager and device driver is inconsistent, then the memory constraints object is transformed to be consistent with the bus manager's endianness.

21 Claims, 12 Drawing Sheets

ENDIANNESS CHECKING FOR PLATFORM-INDEPENDENT DEVICE DRIVERS

1. CROSS REFERENCE TO RELATED APPLICATIONS

This application is related to pending U.S. patent application Ser. No. 09/048,333, filed Mar. 26, 1998, which is incorporated herein by reference.

2. BACKGROUND OF THE INVENTION

2.1 The Field of the Invention

The present invention relates to the field of computing, and, more particularly, to computer operating system architecture. Still more particularly, the present invention relates to software, methods and systems that provide access to computer system resources for device drivers. The invention has applications in the fields of electronics and computer science.

2.2 Background

A device driver is software used to enable the exchange of data between a computer system (or "platform") and a peripheral device that is coupled with the computer system. Usually, the peripheral device functions to provide data input and/or output ("I/O") to the computer system. Examples of peripheral devices include keyboards, printers, scanners, network interface and graphics cards, modems, and monitors. In general, device drivers process data being to be sent to or retrieved from the peripheral device by the computer system so that the data is transferred in a format suitable for processing by the peripheral device or computer system.

The intimate association between the device driver and the hardware and software of the both the peripheral device and computer system to which the device is couple has required that device drivers be written in a highly platform-dependent manner. For example, device drivers generally must obtain memory space when called to perform their function. Typically, this requires the allocation of memory space that must be described by the driver. The driver must therefore have specific knowledge about the platform in order to make such a request. Thus, the same peripheral device, e.g., a printer, will require different version of device (printer) driver software for each platform.

The platform dependence of driver software thus increases the costs of developing platforms and peripherals, as manufactures of peripherals and computer operating systems must provide new versions and updates of driver software for new peripherals, new software platforms, and new operating system releases. Platform-dependent driver technology also increases the cost of maintaining computer systems, especially diverse computer systems deployed over networks, as system managers must obtain and install new and updated device drivers to enable user access to peripheral devices.

Therefore, it would be advantageous to provide device drivers that are platform-independent, i.e., drivers that do not require information about specific platforms as a prerequisite to operation. Such platform-independent device drivers would be capable of running on any platform, thus greatly reducing the costs and frustrations associated with device driver management.

3. SUMMARY OF THE INVENTION

The present invention meets these demands by providing a platform-independent device driver. As discussed below, the platform-independence of the device driver of the invention results from the use of abstract memory objects that allow for the description of memory without actual resource allocation by the computer system. By providing a general, platform-independent means and method for device drivers to request memory, the necessity for the inclusion of highly complex, platform-specific code to enable drivers to request memory is eliminated. More particularly, the present invention provides methods, apparatus, and software that provide endianness checking and provides allocated memory that has the appropriate endianness for the device driver.

In one aspect, the present invention provides a method for allocating memory resources to a platform-independent device driver. According to one embodiment, the method of the invention includes generating a memory allocation request from a platform-independent device driver. The driver instantiates a memory constraints object that is configured to report the endianness of the driver. The request is received by a bus manger that is configured to process memory allocation requests from the device driver. The bus manager has an endianness independent of the device driver. A determination is made as to whether the endianness reported by the memory constraints object is consistent with the bus manager's endianness. If endianness is inconsistent, then the memory constraints object is transformed to be consistent with the bus manager's endianness.

In another embodiment, the memory constraints object includes a first field that holds a value corresponding to the endianness of the device driver and a second field that holds a value indicating whether the endianness value of said first field has been swapped. In still another embodiment, the value of the second field is changed if the endianness value in the first field is not consistent with the endianness of the bus manager.

In another aspect, the present invention provides a computer system that is configured to allocate memory to a platform-independent device driver. In one embodiment, the computer system of the invention includes a platform-independent device driver configured to request memory allocations using a memory constraints object, the memory constraints object being configured to report the endianness of said device driver. The computer system also includes a bus manager that is configured to process requests for the allocation of memory using an abstract address space representation of the computer system's memory. The bus manager has an endianness independent of the endianness of said device driver.

In still another aspect, the present invention includes computer-readable media and computer data signals that encode computer-readable code devices and instructions configured to cause a computer to generate a platform-independent device driver and a bus manager. The device driver and bus manager each have endianness that is independent from the other. The device driver generates a request for an allocation of memory by instantiating a memory constraints obejct that reports the endianness of the driver. The request is received by the bus manager and a determination is made as to whether the endianness of the bus manager and device driver are consistent. The memory constraints object is transformed to report the endianness of the bus manager if the bus manager and device driver have inconsistent endianness.

These and other aspects and advantages of the present invention will become more apparent when the Description below is read in conjunction with the accompanying Drawings.

4. BRIEF DESCRIPTION OF THE DRAWINGS

5. DESCRIPTION OF SOME SPECIFIC EMBODIMENTS

The present invention includes software, methods, and apparatus that provide platform-independent device drivers. According to one embodiment of the invention, described in greater detail below, a device driver that is configured only for a specific bus architecture is provided. The device driver obtains memory by requesting memory objects from a bus manager configured for the same bus architecture as the device driver. The request from the device driver is made by specifying a memory descriptor object, which specifies abstract addresses of memory with respect to an abstract address space managed by the driver's bus manager. However, the memory descriptor object does not have any real system memory resources allocated to it. The bus manager and a platform manager allocate a real memory object, which does have real system memory resources allocated to it, in a real memory address space for the driver. The memory resources allocated correspond to the abstract addresses specified by the memory descriptor. The bus manager may also be coupled with one or more additional that are arranged intermediate the bus and the platform managers. Thus, the device driver of the invention requires no "knowledge" of (i.e., no specific configuration for) the platform on which it operates beyond a knowledge of the bus architecture used by the platform.

5.1 Introduction

Figure 1:
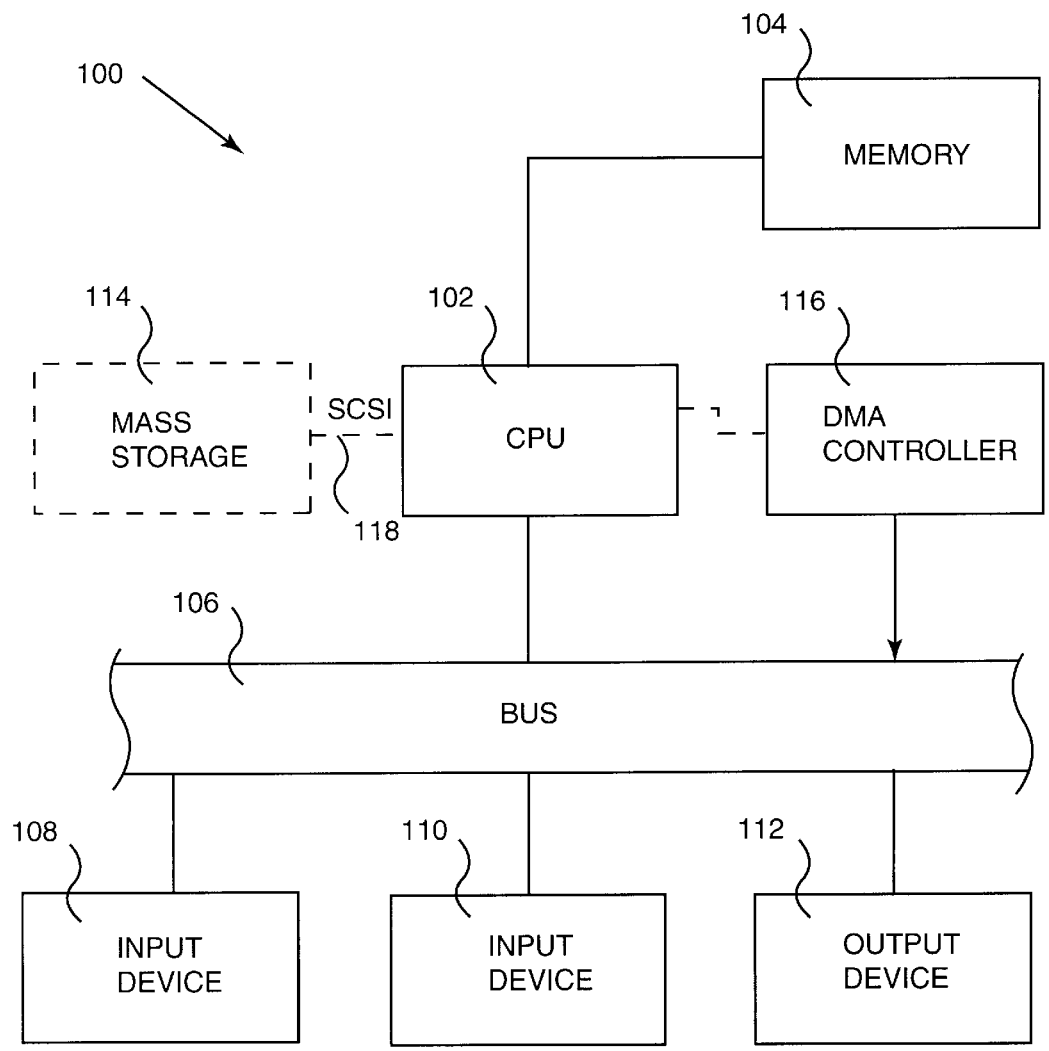
FIG. 1 is a schematic illustration of a computer system, or "platform", in accordance with the present invention.

FIG. 1 shows an example of a computer system 100 in accordance with an embodiment of the present invention. Computer system 100 includes a central processing unit ("CPU") 102, such as, for example, a Sun Microsystems SPARC, Motorola PowerPC, or Intel Pentium processor. CPU 102 is coupled in turn with memory 104. Memory 104 can include any type of memory device used in a computer system, including random access memory ("RAM") and read-only memory ("ROM"). CPU 102 is also coupled with a bus 106, such as a PCI bus, or an S bus. A variety of input devices 108 and 110, and output devices 112 are also coupled with bus 106. Examples of such input and output devices include, but are not limited to, printers, monitors, modems, and/or network/telephone connections. Typically each of these devices has an associated driver as will be described in further detail below. Thus, for example, input device 108 could be a network interface card that connects computer system 100 to a local area network ("LAN"), input device 110 could be a keyboard, and output device 112 could be a monitor. CPU 102 can further be coupled to mass storage 114, such as a hard disk or CDROM drive, and DMA controller 116. The connection between CPU 102 and mass storage 114 can be over a second bus 118, such as a small computer system interface ("SCSI") bus.

Although computer system 100 has been illustrated using a certain configuration of hardware elements, it will be appreciated that the invention is not limited to operation on such configurations alone. Thus, computer system 100 is representative of computer systems in general terms and includes a wide variety of computing devices including, but not limited to, personal computers, mainframe or minicomputers, and "smart" systems such as set-top boxes used to access high definition television, cable, or satellite transmission as well as cellular telephones. Still more examples of computer systems suitable for use with the present invention will be apparent to those of skill in the computer science and electronics arts.

Figure 2:
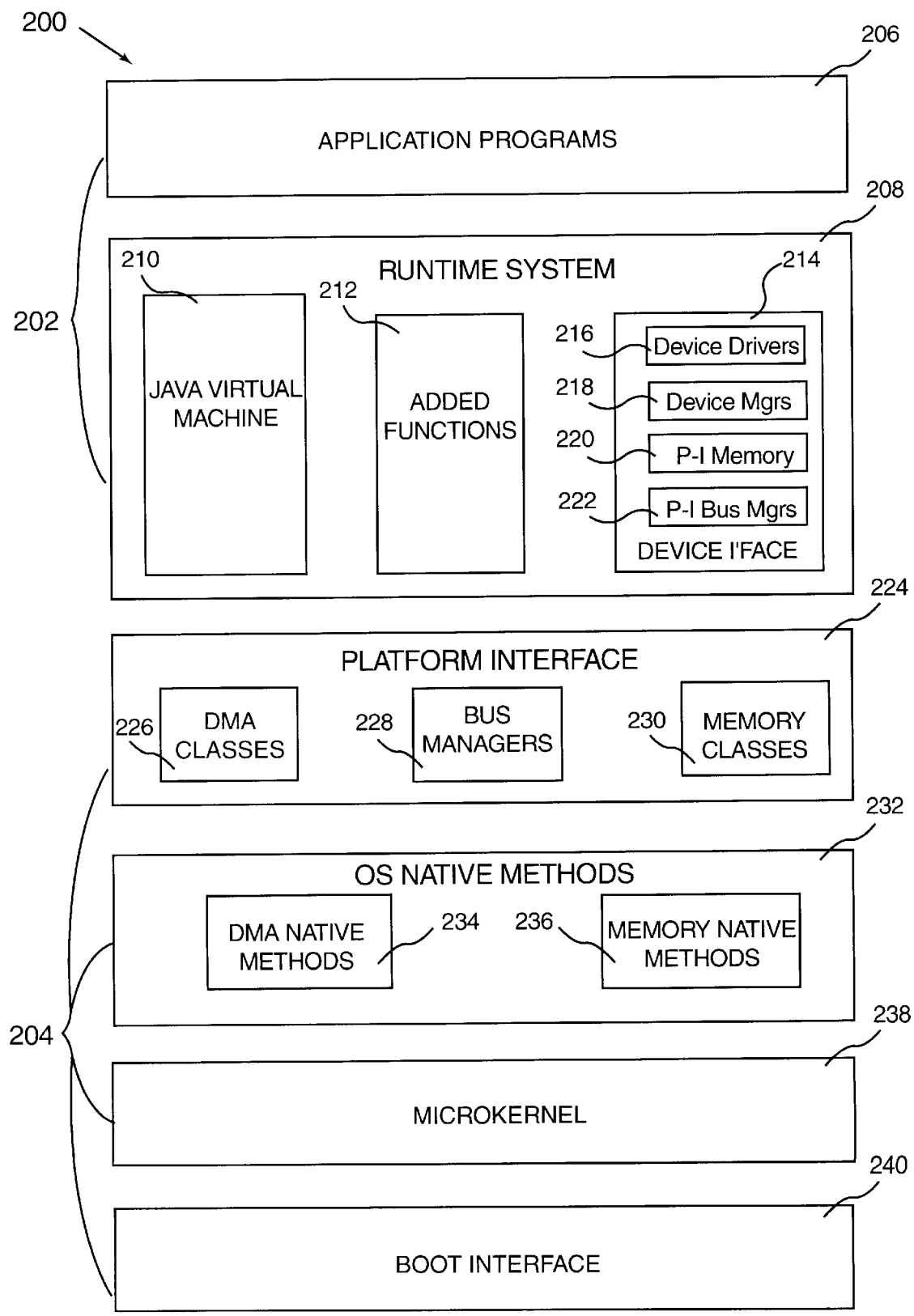
FIG. 2 is a diagram illustrating an object-oriented operating system in accordance with an embodiment the present invention, such as JavaOS from Sun Microsystems, Inc. (Mountain View, Calif.).

FIG. 2 illustrates at 200 an example of software, such as stored in memory 104 and/or running on CPU 102, arranged in a series of layers. The two upper-most layers 202 include software that is platform-independent, i.e., software that is not specially configured to run on a particular computer system but that can be run on any of several computer systems. The remaining lower layers 204 are platform-dependent software, i.e., software that must be written especially for a particular computer system.

Layers 202 include an applications layer 206. Layer 206 includes software applications that are commonly run by computer users. Such software includes word processors, graphics programs, database programs, and desktop publishing programs. These applications run in conjunction with runtime system 208. Runtime system 208 includes, in one embodiment, a Java Virtual Machine ("JVM") 210 that receives instructions in the form of machine-independent bytecodes produced by the application running in applications layer 206 and interprets the instructions by converting and executing them. Other types of virtual machine can be used with the present invention, however, as will be apparent to those of skill in the computer science and electronics arts.

Runtime system 208 further includes a set of additional functions 212 that support facilities such as I/O, network operations, graphics, printing, and the like. Also included with runtime system 208 is device interface 214 that supports the operation of buses 106 and 118, and devices 108, 110, and 112. Device interface 214 includes device drivers 216, which are object-oriented programs written to support the various devices coupled with computer system 100 such as devices 108, 110, and 112; device managers 218, platform-independent memory 220, and platform-independent bus managers 222 that support buses 106 and 118. Thus, it will be appreciated that device drivers 216 and bus managers 222 can be used with any platform, including platforms yet to be developed. Other various managers and components (not shown) are typically provided with device interface 214 and will be known among those skilled in the computer science and electronics arts.

Platform-dependent layers 204 include platform interface 224 that contains DMA classes 226, bus managers 228, and memory classes 230 in addition to other facilities that support runtime system 208. Additional functions are also included in platform interface 224 including interrupt classes (not shown) to support computer system 100. In one embodiment, these classes, managers, and functions are written in the Java programming language. Additional details about these features can be found in the above-referenced, co-pending U.S. patent application Ser. No. 09/048,333.

OS native methods 232 includes DMA native methods 234 and memory native methods 236 that are written in a language specific to CPU 102 (and thus are "native"). These methods interface with microkernel 238. Finally, at the lowest layer is boot interface 240 that supports inter alia the loading and initialization of software into memory when computer system 100 is started. Additional details about these features can be found in the above-referenced, co-pending U.S. patent application Ser. No. 09/048,333.

5.2 Allocation of Device Driver Memory

Figure 3:
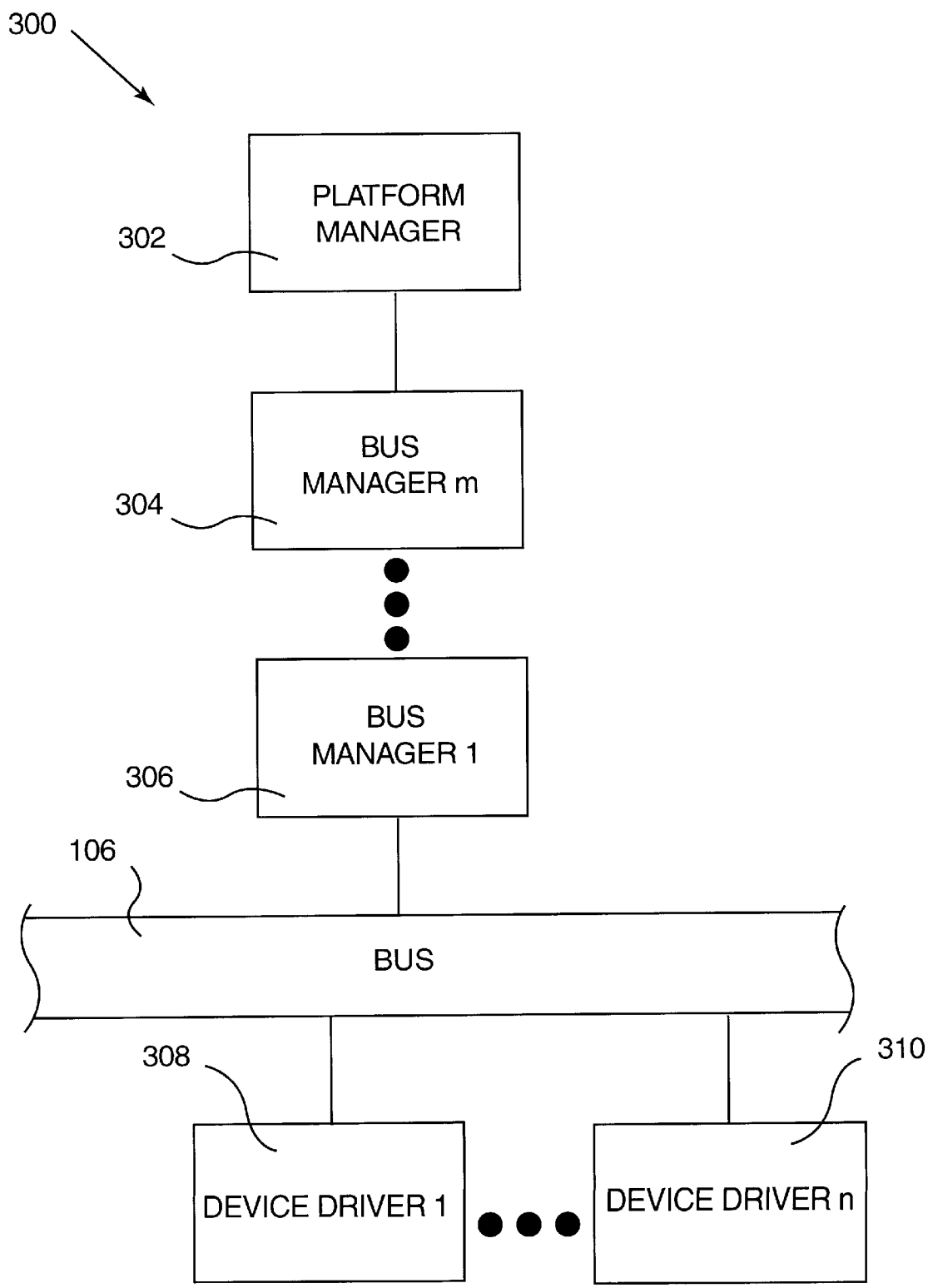
FIG. 3 is a diagram illustrating an arrangement of device drivers, bus managers, and a platform manager coupled to a bus in accordance with an embodiment of the present invention.

The relationship among the platform-independent bus managers 222 and device drivers 216 is illustrated in greater detail in FIG. 3 at 300. There, platform manager 302 sits atop a hierarchy of m bus managers for m buses, including Bus Manager 1 at 304 through Bus Manager m at 306. Bus Manager 1 is coupled with bus 106 which is coupled to each of n device drivers for n devices, shown generally as Device Driver 1 308 through Device Driver n 310. Alternatively, only one bus manager and one device driver could be coupled to bus 106. Platform Manager 302 functions to allocate real memory (i.e., physical memory such as port I/O memory, virtual memory, or DMA memory) as opposed to abstract memory. Bus managers 304 and 306, and drivers 308 and 310 function generally as described and above. One embodiment of the invention in which the communication between drivers 308 and 310 through bus managers 304 and 306 to platform manager 302 to allocate memory for the device drivers in platform-independent manner will now be described.

According to one aspect of the present invention, a method, system, and software for allocating memory to a platform-independent device driver are provided in which a platform-independent device driver specifies its request for the allocation of memory in terms of an abstract address space associated with a bus manager. The bus manager receives the request and then translates the request from the bus manager's abstract address space to either a higher bus manager's abstract address space, if a hierarchy of bus managers is present, or to the highest-level bus manager, the platform manager, which uses a real address space. When the request reaches the platform manager, real memory is allocated and the requested addresses are passed back to the device driver via the lower-level bus manager(s). Thus, the device driver is not required to communicate with the platform manager in terms of real memory that would necessitate platform-dependent coding of the device manager. Rather, by communicating with the platform manager via bus manager(s), the device driver can process its request for memory allocation in terms of a single bus manager's abstract address space—which is platform independent.

In one embodiment, the above-described communication is performed using a hierarchical abstract memory object class and related sub-classes provided by the Java programming language. These class and sub-classes are described in detail in the above-referenced, co-pending U.S. patent application Ser. No. 09/048,333. It will be appreciated, however, that the methods, systems, and software described herein can be enabled using any similar programming language using techniques known to those of skill in the computer science arts.

Figure 4:
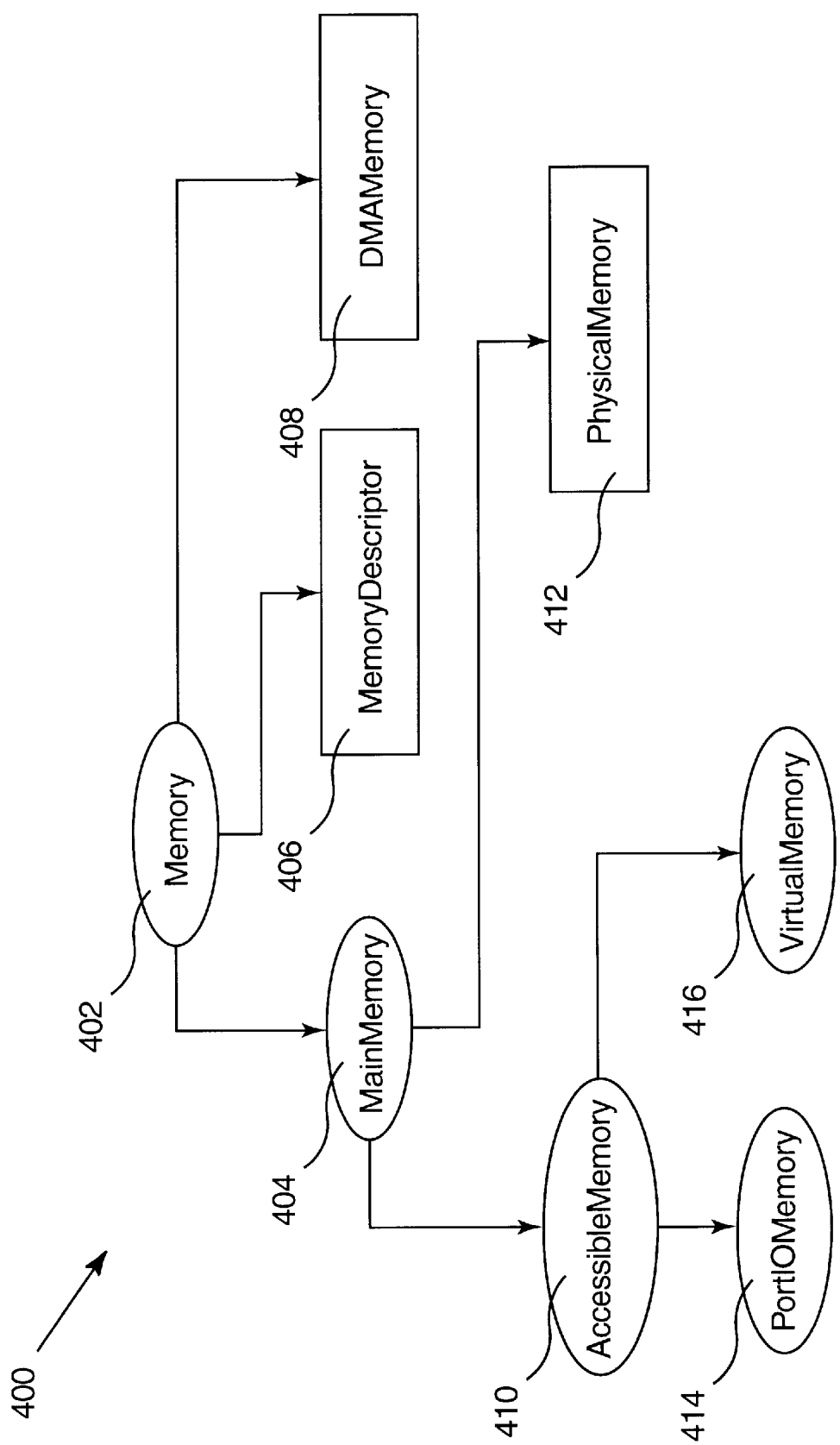
FIG. 4 is a diagram illustrating a memory object hierarchy in accordance with an embodiment of the present invention.

Referring now to FIG. 4, the above-described hierarchy of abstract (non-instantiable) and instantiable memory classes and is illustrated in greater detail at 400. Hierarchy 400 is headed by Memory abstract class 402. This class includes only the general attributes of a Base Address, Length, and Constraints, each of which attributes are also objects. The Base Address and Length attributes are those known in the computer science arts. The Constraints attribute holds various memory allocation and access constraints. The abstract sub-class MainMemory 404 and instantiable sub-classes MemoryDescriptor 406 and DMAMemory 408 inherit directly from Memory.

MainMemory 404 is an abstract class that includes with those attributes inherited from Memory 402 abstract methods for managing caching that are ultimately implemented in the instantiable classes PhysicalMemory 41Z, PortIOMemory 414, and VirtualMemory 416. The latter two classes inherit from MainMemory through the abstract class AccessibleMemory 410 that also inherits from MainMemory. Cache management methods are necessarily platform-specific; however, by using the abstract class MainMemory, those platform-specific memory management functions can be accessed in a platform independent manner. In one embodiment, AccessibleMemory contains only platform-independent methods and is passed from bus managers to drivers. Drivers also are configured to use only the platform-independent methods in MainMemory and Memory. The platform-specific methods in PhysicalMemory, PortIOMemory, VirtualMemory, and DMAMemory are used by the bus manager, which has platform-specific information, to allow the driver to access memory in a platform-independent manner as described below.

MemoryDescriptor 406 is a non-abstract class that includes the objects AddressSpace and DevInfo in addition to the Base, Length, and Constraint objects inherited from Memory. AddressSpace includes bus-specific information and methods on the abstract address space used by the bus manager. DevInfo holds bus-specific information obtained from the bus manager and includes methods that allow the device driver to choose the correct MemoryDescriptor object from an array of such objects as described below. DMAMemory 408 provides methods for establishing DMA mappings to physical memory and for performing the corresponding unmapping. Thus, device drivers can use DMA-Memory objects to obtain a base address to pass to DMA controller 116 in a platform-independent manner.

Figure 5:
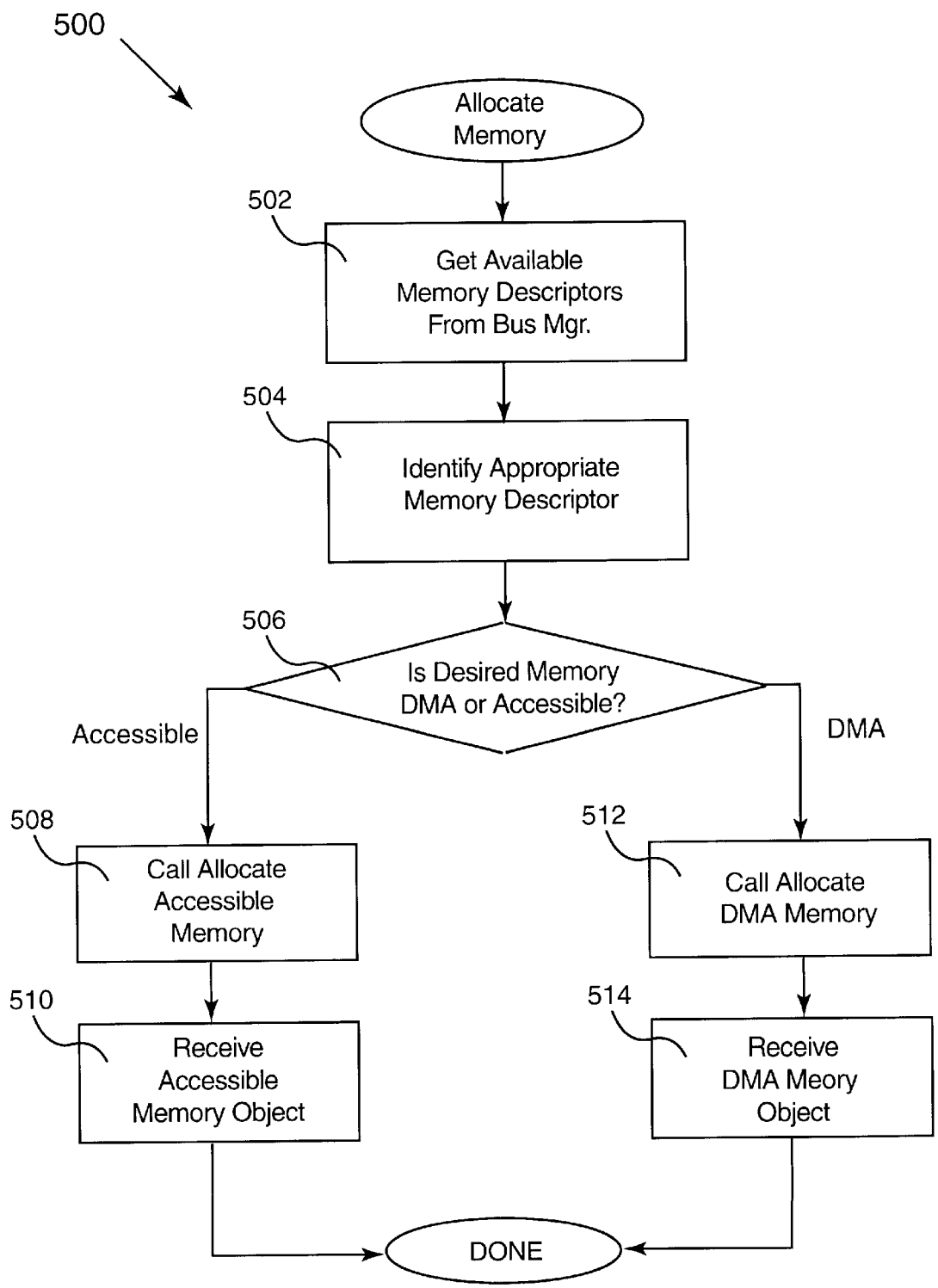
FIG. 5 is a flow chart illustrating the operation of memory allocation for a device driver in accordance with an embodiment of the present invention.

One embodiment of a method by which the above-described drivers, managers, and objects function together to provide platform-independent drivers is described with respect to FIG. 5 at 500. At step 502 the device driver passes a request for memory allocation to the lowest-level bus manager. The bus manager creates an array of MemoryDescriptor objects that may be used by the device driver. The number of MemoryDescriptor objects in the array will depend on the number of types of memory object that the particular device driver may wish to allocate. That is, in the described embodiment, the list only contains MemoryDescriptor objects that the device driver may actually have a need to use. Although in theory, any number of MemoryDescriptor objects may be utilized by a particular device, in practice the number is typically quite small. Each of the entries in the MemoryDescriptor objects includes platform-dependent information in the AddressSpace and DevInfo object fields. The array may also be a "read-only" array, so that the device driver cannot modify the MemoryDescriptor objects. The array may be constructed in a variety of ways. In one embodiment, the JavaOS operating system is used and the bus manager constructs the array by first contacting the Java System Loader which creates a list of all associated MemoryDescriptor objects at start-up. In another embodiment, the array is constructed at the time the device driver is loaded. At step 504 the device driver uses the information contained in the DevInfo object field to identify the appropriate MemoryDescriptor object. In one embodiment, the device driver uses the information stored in the Base, Length, and AddressSpace object fields to select the appropriate MemoryDescriptor object. In another embodiment, the device driver uses the information stored in the Base, Length, AddressSpace, and DevInfo object fields to select the appropriate MemoryDescriptor object.

Having determined the appropriate MemoryDescriptor object, at step 506 different memory allocation pathways are taken depending upon whether the desired memory is "accessible" memory or "DMA" memory. If accessible memory is desired, then flow then moves to step 508 wherein accessible memory is allocated by the platform manager and the addresses are provided to the MemoryDescriptor object in the object's AddressSpace field. In step 510 the MemoryDescriptor object containing the real memory addresses (or a reference to that object, such as an object reference) is received by the device driver for processing by the driver. Alternatively, if the memory to be allocated is DMA memory, then control moves to step 512 wherein DMA memory is allocated, and, at step 514, an appropriate memory object (or object reference) is received by the device driver.

Figure 6:
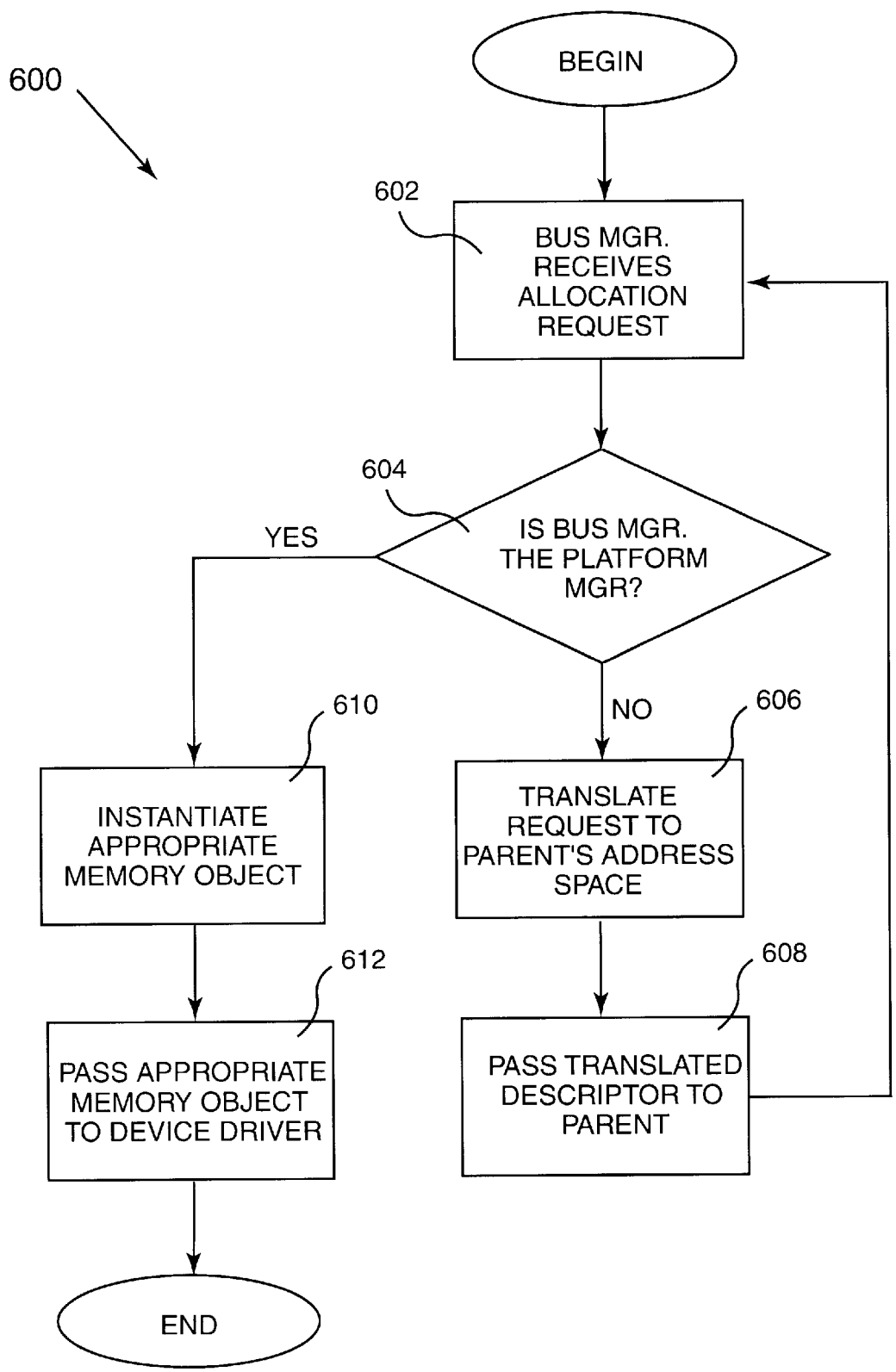
FIG. 6 is a flow chart illustrating step 508 of FIG. 5 in greater detail.

The details of steps 508 and 512 that follow from the determination at step 506 are largely identical, except for the details of allocating accessible or DMA memory, and will be discussed together with respect to FIG. 6 at 600. Starting at step 602, the bus manager receives the allocation request from the device driver. In one embodiment, the device driver also selects the appropriate MemoryDescriptor object. At step 604 the bus manager determines whether it is the highest-level bus manager, i.e., the platform manager. If the bus manager is not the platform manager (i.e., the answer at query 604 is "no"), then, at step 606, the bus manager translates the addresses in the MemoryDescriptor object to comport with the requirements of the higher-level bus manager. At step 608 the translated MemoryDescriptor object is passed to the next higher-level bus manager and the loop is repeated at step 604. The loop may be repeated several times, once for each bus manager intermediate between the first bus manager and the platform manager. It should be appreciated that the step of determining whether a particular manager is a bus manager or a platform manager would be inherent to the manager, and so there would typically not be an actual check. Rather, the step is described only to facilitate an understanding of the operation of the invention.

In step 606, when the bus manager translates the addresses in the MemoryDescriptor object to comport with the requirements of the higher-level bus manager, the addresses inside the AddressSpace object are not translated. Rather it is the addresses inside of the MemoryDescriptor object which are translated. In a more specific example, when bus manager gets a MemoryDescriptor (referred to in this example as "MD1") the MemoryDescriptor object contains a base address "BA1", and a base length "BL1" (since MemoryDescriptor is a sub-class of Memory, see above). These addresses are all addresses of the abstract address space used by the bus manager (referred to in this example as "AS1"). The bus manager translates these addresses to a new address space ("AS2") of a translated MemoryDescriptor object ("MD2") when passing the request to a second bus manager for an address space managed by that bus manager. Thus BA1, as an address in the address space AS1, is translated to BA2 of the address space AS2 (similarly for BL1). This continues until the platform manager is reached and where the address space is a real address space of the platform.

A more concrete example is provided here. A device driver is written for a PCI bus which has no intervening bus manager between the PCI bus manager and the platform. The driver requests memory specifying address 0x300 of the "config" address space of the PCI bus. The PCI bus manager knows that config happens to start at port 0x2000 and is mapped 1-to-1, so it translates 0x300 of the config address space to 0x2300 of the "port I/O" address space. On a SPARC platform, the 0x300 address would still be requested by the device driver (which is platform-independent), but this time the bus manager would know that the config address space is mapped to physical address 0x14000, and so the translation would be to 0x14300 of the physical memory address space.

If the bus manager called by the device driver is the platform manager, or when the translated MemoryDescriptor object reaches the platform manager, then, at step 610, the platform manager allocates real memory addresses. The addresses allocated are accessible memory addresses if the choice of MemoryDescriptor object is consistent with an affirmative answer at step 506. Otherwise, the addresses allocated are DMA addresses. In either case, the platform manager passes the appropriate memory object (AccessableMemory or DMAMemory) to the next lowest bus manager, and so on until the MemoryDescriptor object is passed to the device driver. If there is no bus manager hierarchy, then the MemoryDescriptor object is passed directly to the device driver. The driver then performs its functions as designed using the real memory addresses obtained by using the indirect address request process just described.

The use of the above-described MemoryDescriptor object as a means of allocating memory provides two advantages. First, MemoryDescriptor objects are memory objects in an abstract address space. This address space does not really exist on the platform, but only in the world of the bus manager. Thus, memory resources that can be allocated can also be fully characterized; yet, no system resources need be allocated. Second, MemoryDescriptor object, being subclasses of Memory, appear to the device driver to be very similar in form to the memory objects (i.e., AccessibleMemory or DMAMemory) that will eventually be allocated to the device driver. This similarity simplifies driver design.

5.3 Secure Allocation of Device Driver Memory

In some cases, it is desirable to implement the above-described allocation of device driver memory, or any other calls from a device driver to a bus manager (e.g., for other system services such as connecting, disconnecting, or interrogating interrupts) in a secure way. This is especially important where network-based drivers, such as drivers written in Sun Microsystems' Java programming language, are available from parties other than the operating system developer. For example, it may be desirable to prevent a "rogue" device driver from identifying itself to a bus manager as another, legitimate driver. This could be useful to improve system robustness, e.g., by allowing the system to identify and isolate corrupted device drivers and thus avoid system crashes. Such a security mechanism could also be useful to prevent "spoofing" device drivers from erasing, altering, and/or copying sensitive data from the system surreptitiously. By way of example, a malicious spoofing device driver could masquerade as a printer driver and copy the data to be printed to a remote location.

Figure 7A:
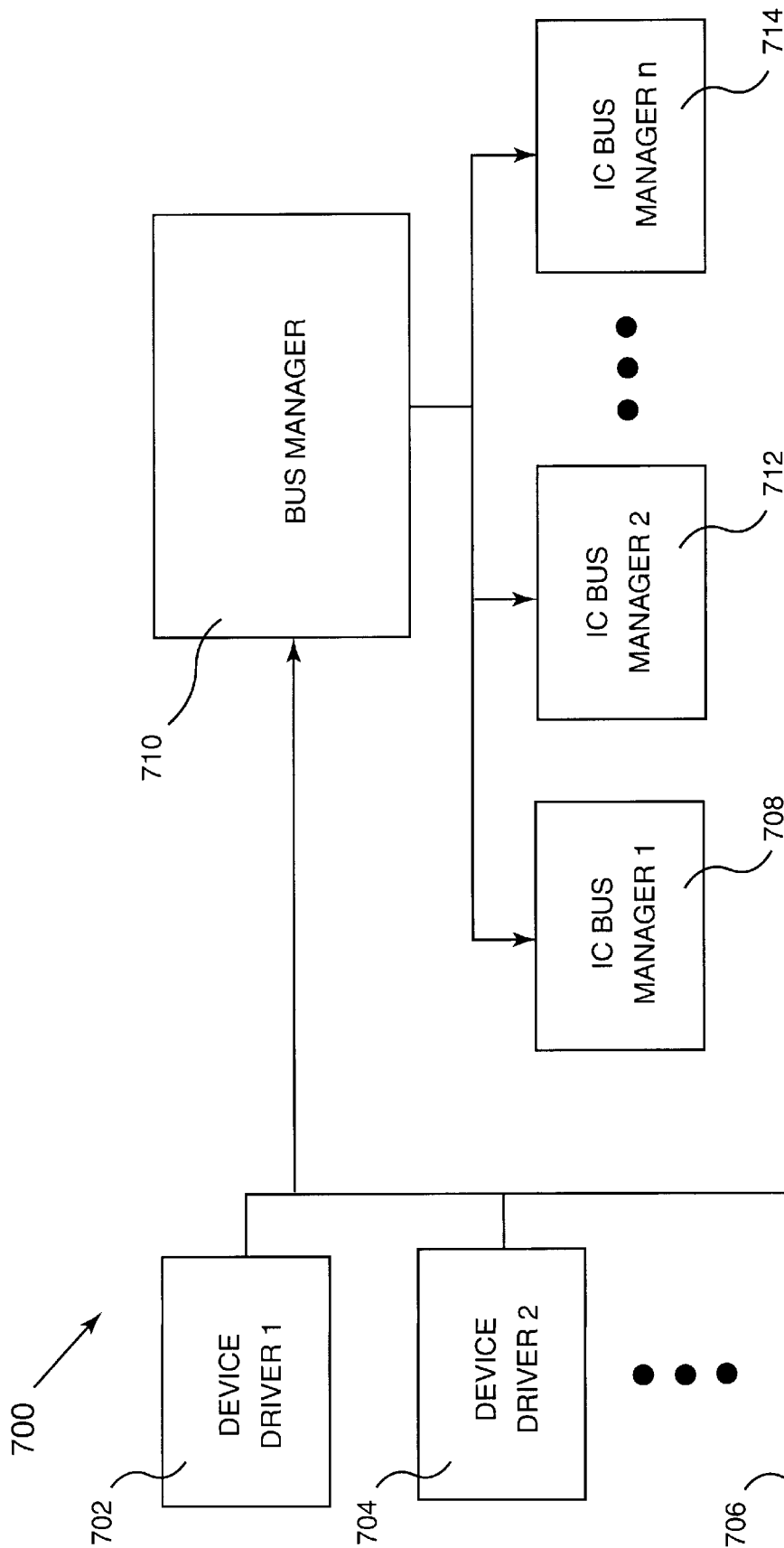
FIG. 7A and FIG. 7B illustrate the nominal and actual relationships among a Bus Manager, Inner Class Bus Managers associated with the Bus Manager, and Device Drivers assigned to the Bus Manager in accordance with one embodiment of the invention.
Figure 7B:
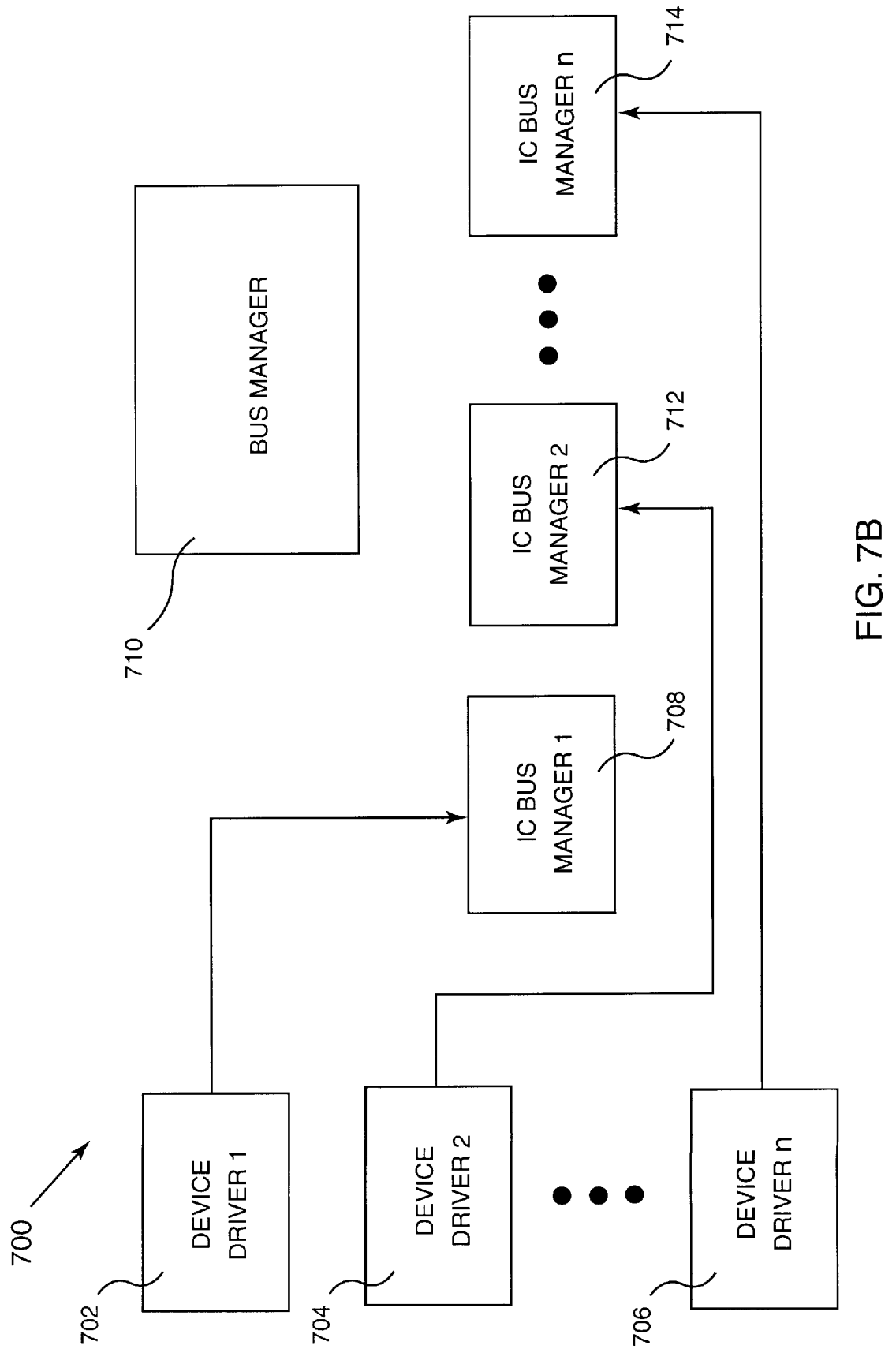

One embodiment of such a security mechanism provided by the present invention is illustrated with respect to the device driver/bus manager architecture illustrated in FIGS. 7A and 7B. FIG. 7A shows a series of device drivers Device Driver 1 702, Device Driver 2 704, . . . , Device Driver n 706, respectively. The device drivers are each assigned nominally to communicate with Bus Manager 710, which, in turn, is associated with a series of Inner Class (IC) Bus Managers IC Bus Manager 1 712, IC Bus Managers 2 714, . . . , and IC Bus Manager n 716, i.e., each IC Bus Manager is an "inner class" instantiation of Bus Manager 710 and inherits all of the methods of Bus Manager 710. Each IC Bus Manager is assigned to one, and only one, of the Device Drivers, and appears to its assigned Device Driver as Bus Manager 710. Thus, the actual flow of communication between each of the Device Drivers and its uniquely associated IC Bus Manager is illustrated in FIG. 7B. By using a secure method for assigning each Device Driver to each IC Bus Manager, the present invention avoids the problems of errant or rogue Device Drivers as such drivers cannot gain access to system resources.

Figure 8:
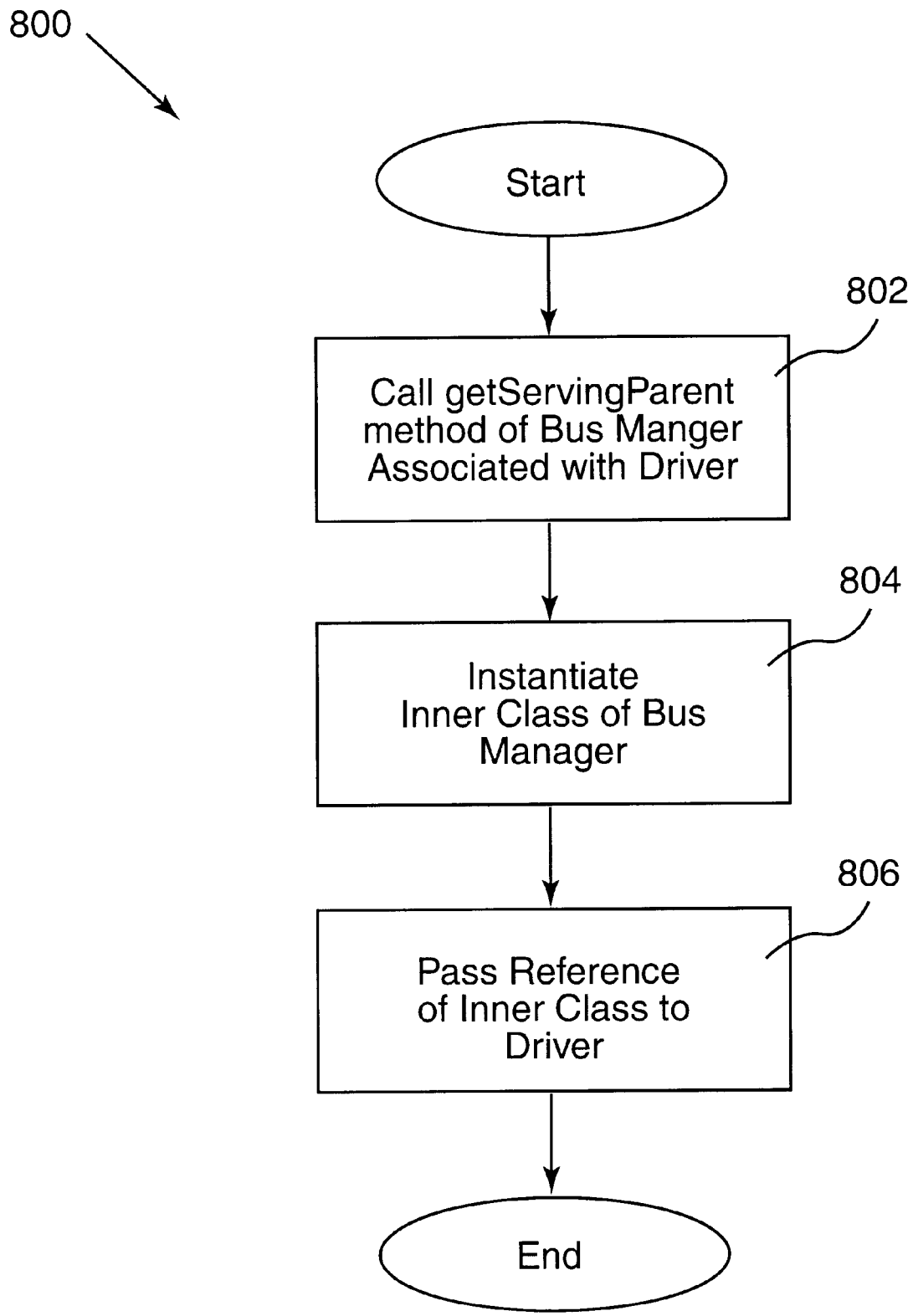
FIG. 8 is a flow chart illustrating the allocation of system resources to a device driver in a secure fashion.
Figure 9:
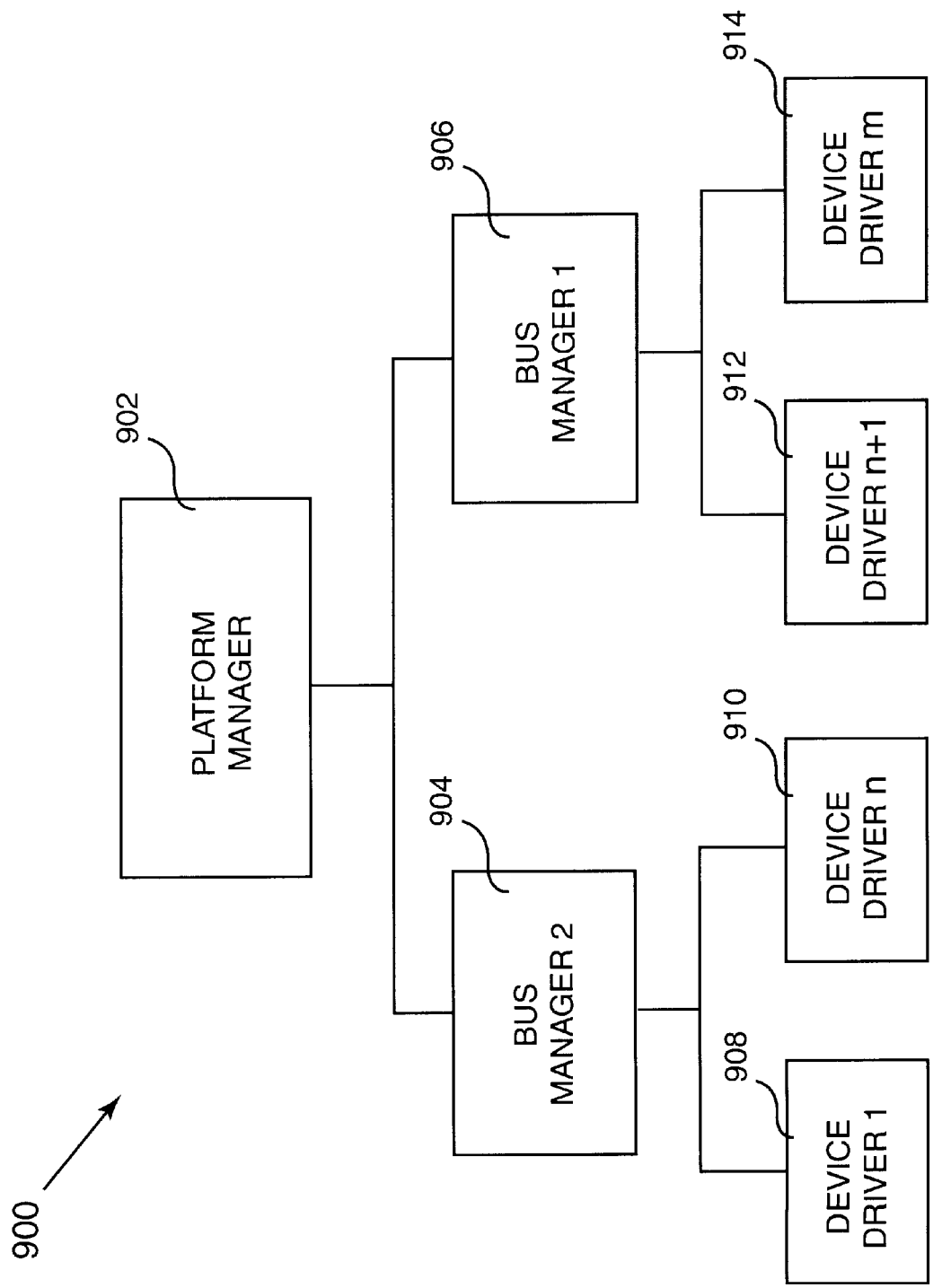
FIG. 9 is an illustration of a Java System Database entry in accordance with one embodiment of the invention.

One embodiment of a method for providing the above-described secure bus manager support is shown in FIG. 8. The method described in this embodiment includes the use of procedures and facilities supported by JavaOS, but equivalent procedures and facilities for other operating systems will be apparent to those of skill in the computer science arts. As shown at 800, in a first step 802, when the device driver is loaded by the Java System Loader ("JSL"), the device driver's object reference is passed to the bus manager assigned to service the device driver. The bus manager method getServingParent is called and passed the device driver's object reference. The device driver's object reference and bus manager assignment is determined by the JSL which "walks" down a "device tree" constructed by the Java System Database ("JSD") as illustrated in FIG. 9 at 900. There, an example tree includes an entry for Platform Manager 902 which has a "parent" relationship with Bus Manager 2 904 and Bus Manager 1 906. Bus Manager 2 has itself a parent relationship with the device drivers Device Driver 1 908, . . . , Device Driver n 910. Bus Manager 1 has itself a parent relationship with the device drivers Device Driver n+1 912, . . . , Device Driver m 912. In this way, each registered device driver is assigned to an appropriate bus manager.

Figure 10:
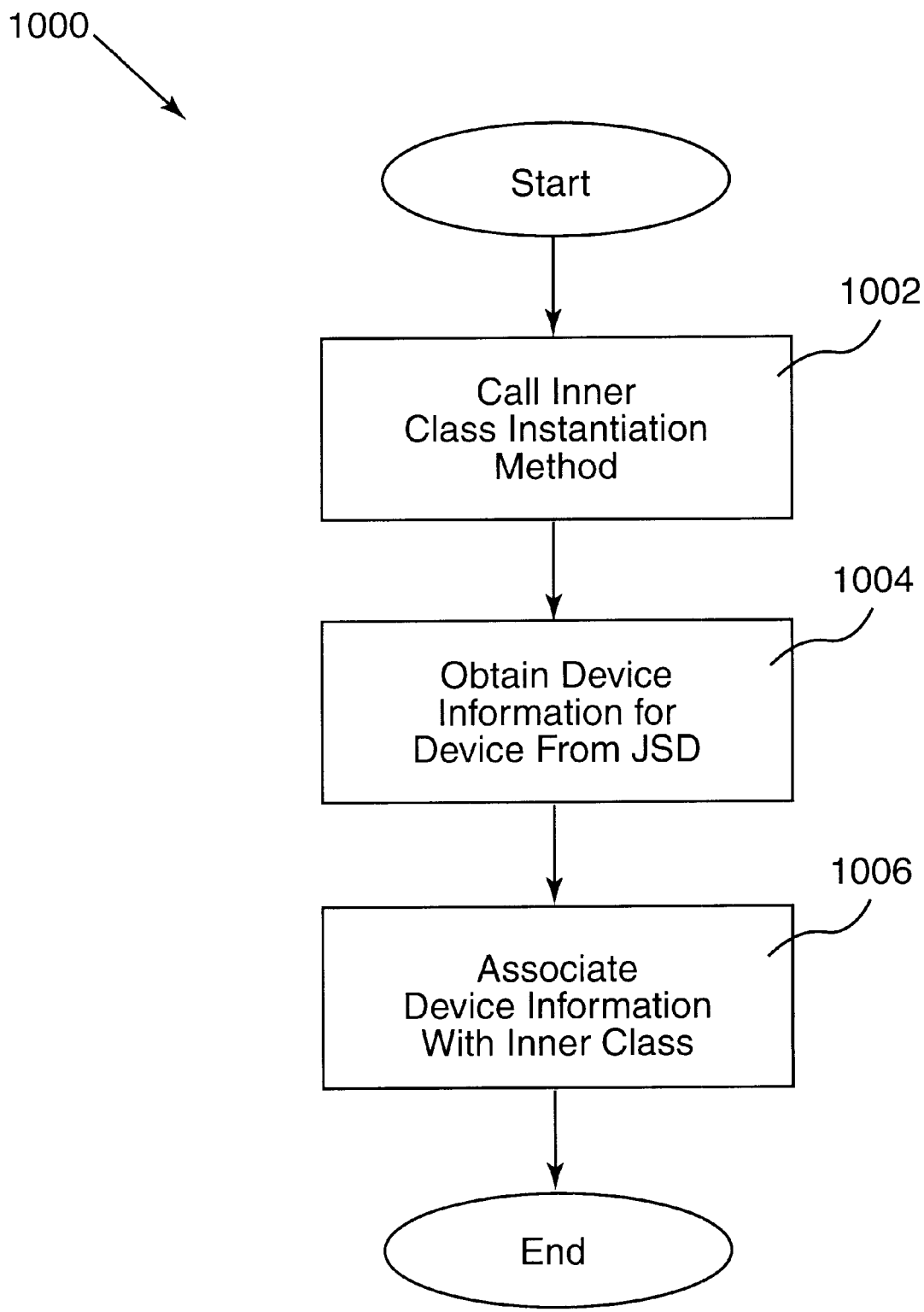
FIG. 10 is a flow chart illustrating step 804 of FIG. 8 in greater detail.

Returning to FIG. 8, at step 804, the IC bus manager is constructed. This step is illustrated in greater detail in FIG. 10 at 1000. Having obtained the object reference for the device driver, the inner class of the bus manager is instantiated at step 1002 by a call to the Inner Class construction method of the bus manager. The object reference for the assigned device driver is passed to the constructor of the IC bus manager, and, at step 1004, information regarding the device driver is obtained from the JSD using the device driver's object reference. At step 1006 this information is copied to a container object available in the IC bus manager to associate the IC bus manager with the device driver.

Returning once again to FIG. 8, at step 806 an object reference to the IC bus manager just constructed is passed to the device driver. The device driver, however, functions as if is was connected to the bus manager directly. Thus, by using inner class representations of the bus manager and making reference to the JSD for information on the device driver only those device drivers known to be associated with devices registered with the JSD can gain access to system resources. An additional level of security can be provided by forcing the device driver to choose the appropriate MemoryDescriptor object from a "read-only" list of such objects made available to the device driver by the bus manager.

5.4 Handling Endianness

The above-described embodiments for providing platform-independent, secure device drivers must also account for situations in which a device driver must access memory of a certain endianness from a platform manager of the opposite endianness. Even more complex are systems having a multiple, hierarchical bus managers, such as illustrated in FIG. 3 as described above. In such situations, the device driver must be configured to account for its endianness requirements, the endianness of each bus manager, and the endianness of the platform manager so that the memory can be "swapped" or "unswapped" as necessary. Such an arrangement, however, requires a platform-dependent device driver. The present invention overcomes this limitation as will be described presently.

In one embodiment, the present invention includes a MemoryConstraints object that is passed from the device driver to the bus manager (or, the instantiated inner class thereof). In one embodiment, the MemoryConstraints object is the Constraints object field of the MemoryDescriptor object that is used to process the memory allocation request of the device driver as described above. However, it will be appreciated that a separate object can be used. Therefore, the discussion below will refer to a MemoryConstraints object generally. The MemoryConstraints object includes at least two object fields, an Endianness Variable field and a Swapped field. The Endianness Variable field indicates to the bus manager whether the endianness of the passing object is "big" or "little". For "big" endian, the most significant byte is stored in the lowest address of memory. For "little" endian the least significant byte is stored in the lowest address of memory. The Swapped variable is a Boolean to indicate whether the endianness of the MemoryConstraints object has been "swapped" previously. Other allocation and access constraints can be included with the MemoryConstraints object if desired.

Figure 11:
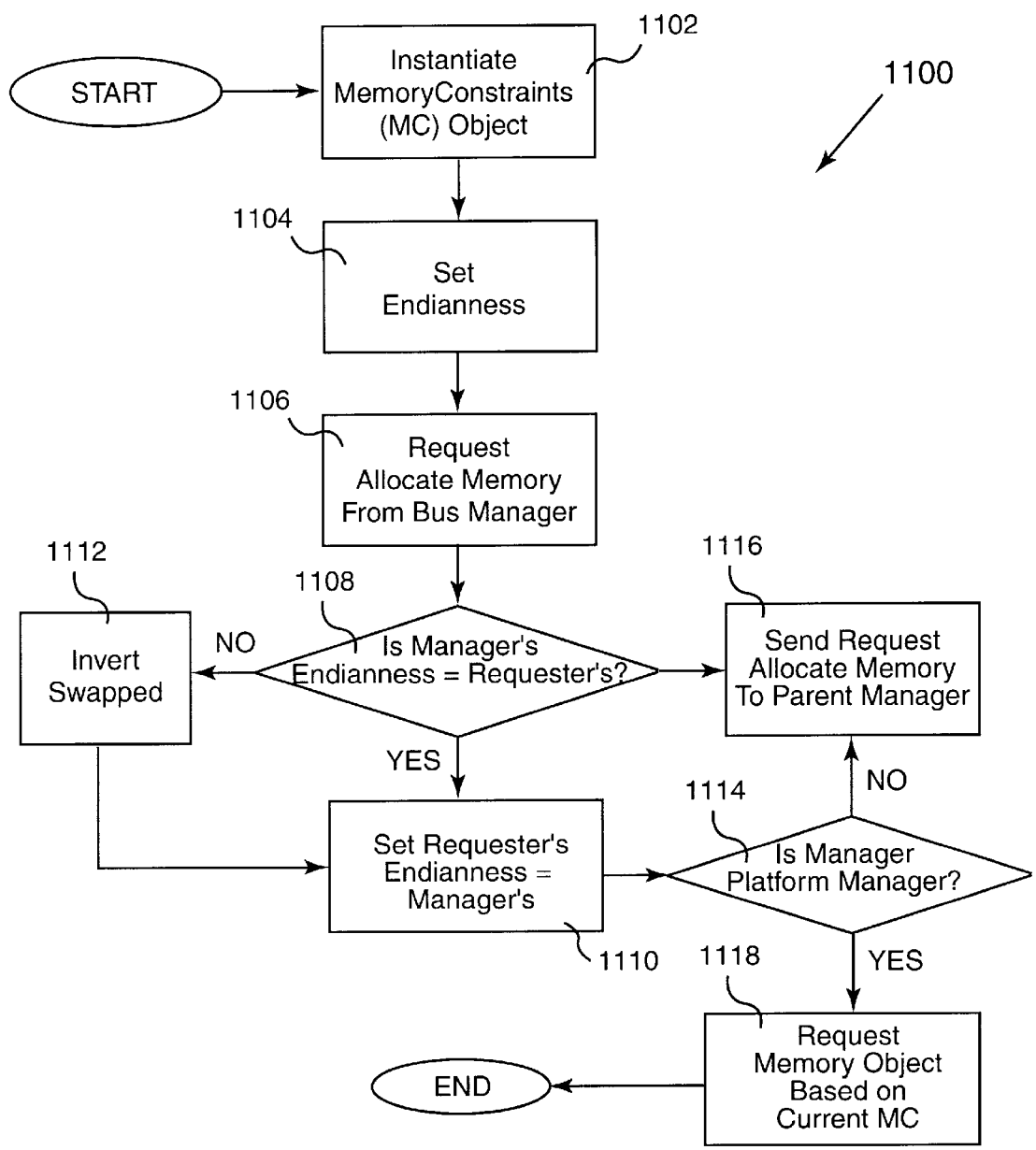
FIG. 11 is a flow chart illustrating a method for handling changes in endianness in accordance with an embodiment of the invention.

The use of the MemoryConstraints object to account for changes in endianness in the allocation of memory for a device driver is illustrated in FIG. 11 at 1100. There, starting at 1102, the device driver instantiates a MemoryConstraints object and sets the default value of Swapped to "False". Next, at step 1104, the endianness for the driver is set to a value corresponding to "big" or "little". The MemoryConstraints object is then passed to the appropriate bus manager as part of a call by the device driver for accessible memory at step 1106.

At step 1108 the endianness of the bus manager is compared to the value provided in the MemoryConstraints object passed by the device driver. If the values are the same, then, at step 1110, the endianness will be that of the bus manager, and the value of Swapped will be unchanged. If the endianness stored in the MemoryConstraints object is different from the bus manager's, the endianness will be that of the bus manager, and the value of Swapped will be inverted at step 1112.

Next, at step 1114, a determination is made whether the bus manager is the highest-level bus manager in the hierarchy (i.e., the bus manager is the platform manager). If the bus manager is not the highest-level manager, then a request for accessible memory is sent to the next-higher manager at step 1116 and the flow returns to step 1108 as described above. Thus, the MemoryConstraints object will be passed up the hierarchy of bus managers, having the Endianness Variable and Swapped object fields changed as described above, until the platform manager is reached. When the platform manager is reached, then, at step 1118 accessible memory is allocated using the current status of the fields in the MemoryConstraints object. The memory will be allocated as described above. Importantly it will be appreciated that the method described herein provides an allocation of accessible memory having the appropriate endianness without a requiring the device driver to be platform-dependent.

6. CONCLUSION

Thus, the described inventions provide methods, software, and systems for platform-independent device drivers. Such device drivers can be run in a secure fashion as described above and allow greater flexibility and reduced costs of construction and maintenance. Although certain embodiments and examples have been used to describe the present invention, it will be apparent to those having skill in the art that various changes can be made to those embodiment and/or examples without departing from the scope or spirit of the present invention. For example, it will be appreciated from the foregoing that many object oriented operating systems can be used to implement the methods, software, and systems described herein using only modifications that will be apparent to those of skill in the computer science arts.

What is claimed:

1. A computer-implemented method for allocating memory resources to a platform-independent device driver in a computer system, comprising the steps of:
   a. generating a request for memory allocation to said device driver by instantiating a memory constraints object that reports the endianness of said device driver;
   b. receiving said request from said device driver using a bus manager configured to process requests for the allocation of memory using an abstract address space representation of said memory, said bus manager having an endianness independent of the endianness of said device driver;
   c. determining whether the endianness reported by said memory constraints object is consistent with the endianness of said bus manager; and
   d. changing said endianness reported by said memory constraints object to be consistent with the endianness of said bus manager when the endianness value of said device driver is not consistent with the endianness value of said bus manager.

2. The computer-implemented method of claim 1 wherein said memory constraints object includes a first field that holds a value corresponding to the endianness of the device driver and a second field that holds a value indicating whether the endianness value of said first field has been swapped.

3. The computer-implemented method of claim 2 further comprising the step of changing said second field if the endianness value of said device driver is not consistent with the endianness value of said bus manager.

4. The computer-implemented method of claim 2 further comprising the step of determining whether said bus manager is a platform manager.

5. The computer-implemented method of claim 4 further comprising the step of allocating memory having the endianness of said first field value if said bus manager is said platform manager.

6. The computer-implemented method of claim 4 further comprising the step of forwarding said request to the parent manager of said bus manager if said bus manger is not said platform manager.

7. A computer system configured to allocate memory to a platform-independent device driver, comprising:
   a. a platform-independent device driver configured to request memory allocations using a memory constraints object, said memory constraints object being configured to report the endianness of said device driver;
   b. a bus manager configured to process requests for the allocation of memory using an abstract address space representation of said memory, said bus manager having an endianness independent of the endianness of said device driver.

8. The computer system of claim 7 wherein said memory constraints object is configured to include a first field that holds a value corresponding to the endianness of the device driver and a second field that holds a value indicating whether the endianness value of said first field has been swapped.

9. The computer system of claim 8 further comprising a platform manager configured to allocate memory in response to said request for memory allocation from said device driver.

10. The computer system of claim 9 wherein said memory constraints object is configured to include a first field that holds a value corresponding to the endianness of the device driver and a second field that holds a value indicating whether the endianness value of said first field has been swapped.

11. The computer system of claim 9 further comprising a mechanism for determining whether said bus manager is said platform manager, wherein said bus manager is further configured to transform said memory constraints object if said bus manager has an endianness not consistent with the endianness of said device driver and said bus manager is not said platform manager.

12. A computer-readable medium containing computer-readable program code devices configured to cause a computer to execute the steps of:
   a. generating a platform-independent device driver and a bus manager;
   b. generating a request for memory allocation to said device driver by instantiating a memory constraints object that reports the endianness of said device driver;
   c. receiving said request from said device driver using a bus manager configured to process requests for the allocation of memory using an abstract address space representation of said memory, said bus manager having an endianness independent of the endianness of said device driver;
   d. determining whether the endianness reported by said memory constraints object is consistent with the endianness of said bus manager; and e. transforming said memory constraints object if the endianness value of said device driver is not consistent with the endianness value of said bus manager.

13. The computer-readable medium of claim 12 wherein said memory constraints object includes a first field that holds a value corresponding to the endianness of the device driver and a second field that holds a value indicating whether the endianness value of said first field has been swapped.

14. The computer-readable medium of claim 13 wherein said computer-readable program code devices are further configured to provide a platform manager configured to allocate memory in response to said request for memory allocation from said device driver.

15. The computer-readable medium of claim 14 wherein said memory constraints object includes a first field that holds a value corresponding to the endianness of the device driver and a second field that holds a value indicating whether the endianness value of said first field has been swapped.

16. The computer-readable medium of claim 15 wherein said computer-readable program code devices are further configured to determine whether said bus manager is said platform manager, wherein said bus manager is further configured to transform said memory constraints object if said bus manager has an endianness not consistent with the endianness of said device driver and said bus manager is not said platform manager.

17. A computer data signal on a carrier wave containing computer-readable program code instructions configured to cause a computer to execute the steps of:

a. generating a platform-independent device driver and a bus manager;
   b. generating a request for memory allocation to said device driver by instantiating a memory constraints object having a first field that holds a value corresponding to the endianness of the device driver and a second field that holds a value indicating whether the endianness value of said first field has been swapped;
   c. receiving said request from said device driver using a bus manager configured to process requests for the allocation of memory using an abstract address space representation of said memory, said bus manager having an endianness independent of the endianness of said device driver;
   d. determining whether the endianness value in said first field of said memory constraints object is consistent with the endianness of said bus manager; and
   e. changing said endianness value of said first field to a value consistent with the endianness of said bus manager when the endianness value of said device driver is not consistent with the endianness value of said bus manager.

18. The computer-readable medium of claim 17 wherein said memory constraints object includes a first field that holds a value corresponding to the endianness of the device driver and a second field that holds a value indicating whether the endianness value of said first field has been swapped.

19. The computer-readable medium of claim 17 wherein said computer-readable program code devices are further configured to provide a platform manager configured to allocate memory in response to said request for memory allocation from said device driver.

20. The computer-readable medium of claim 19 wherein said memory constraints object includes a first field that holds a value corresponding to the endianness of the device driver and a second field that holds a value indicating whether the endianness value of said first field has been swapped.

21. The computer-readable medium of claim 20 wherein said computer-readable program code devices are further configured to determine whether said bus manager is said platform manager, wherein said bus manager is further configured to transform said memory constraints object if said bus manager has an endianness not consistent with the endianness of said device driver and said bus manager is not said platform manager.

* * * * *